United States Patent
Kim

(10) Patent No.: US 11,541,932 B2
(45) Date of Patent: Jan. 3, 2023

(54) VEHICLE SIDE MEMBER

(71) Applicants: HYUNDAI MOTOR COMPANY, Seoul (KR); KIA MOTORS CORPORATION, Seoul (KR)

(72) Inventor: Il Do Kim, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 155 days.

(21) Appl. No.: 17/078,828

(22) Filed: Oct. 23, 2020

(65) Prior Publication Data

US 2022/0001926 A1 Jan. 6, 2022

(30) Foreign Application Priority Data

Jul. 1, 2020 (KR) .................. 10-2020-0081141

(51) Int. Cl.
*B62D 21/11* (2006.01)
*B62D 27/02* (2006.01)
*B62D 29/00* (2006.01)

(52) U.S. Cl.
CPC ............ *B62D 21/11* (2013.01); *B62D 27/023* (2013.01); *B62D 29/008* (2013.01)

(58) Field of Classification Search
CPC ..... B62D 21/11; B62D 27/023; B62D 29/008
USPC ........................ 296/29, 203.01, 203.03, 30
See application file for complete search history.

(56) References Cited

U.S. PATENT DOCUMENTS

| 8,870,274 | B2* | 10/2014 | Mildner | B62D 21/02 |
| | | | | 296/187.11 |
| 11,332,194 | B2* | 5/2022 | Kagami | B62D 21/157 |
| 2010/0164214 | A1* | 7/2010 | Hartmann | B62D 25/08 |
| | | | | 280/781 |
| 2015/0042129 | A1* | 2/2015 | Cho | B62D 25/2027 |
| | | | | 296/203.04 |
| 2018/0273108 | A1* | 9/2018 | Masuda | B62D 25/088 |
| 2020/0086922 | A1* | 3/2020 | Yamada | B62D 25/088 |
| 2022/0009553 | A1* | 1/2022 | Wada | F16F 3/093 |

FOREIGN PATENT DOCUMENTS

| KR | 10-2006-0013888 A | 2/2006 |
| KR | 10-0633902 B1 | 10/2006 |
| KR | 10-2008-0028103 A | 3/2008 |
| WO | 2012-001932 A1 | 1/2012 |

* cited by examiner

*Primary Examiner* — D Glenn Dayoan
*Assistant Examiner* — E Turner Hicks
(74) *Attorney, Agent, or Firm* — Lempia Summerfield Katz LLC

(57) ABSTRACT

A vehicle side member includes: a main member portion which extends in a longitudinal direction of a vehicle; a front-side mounting portion which is one-piece construction with a front portion of the main member portion; a rear-side mounting portion which is one-piece construction with a rear portion of the main member portion; and a damper mounting portion which is one-piece construction with the main member portion, and in which a top end of a damper is received and mounted.

12 Claims, 12 Drawing Sheets

VEHICLE SIDE MEMBER

CROSS-REFERENCE TO RELATED APPLICATION

This application claims priority to and the benefit of Korean Patent Application No. 10-2020-0081141, filed on Jul. 1, 2020, the entire contents of which are incorporated herein by reference.

FIELD

The present disclosure relates to a vehicle side member.

BACKGROUND

The statements in this section merely provide background information related to the present disclosure and may not constitute prior art.

In recent years, as the perception of environmental crisis and depletion of oil resources has increased, eco-friendly electric vehicles such as electric vehicles (EVs) and hybrid electric vehicles (HEVs) have risen to prominence. Each of EVs and HEVs has one or more batteries mounted on the bottom of a vehicle body, and accordingly it has increased weight due to such relatively heavy batteries, compared to internal combustion engine vehicles.

It is very important for the eco-friendly electric vehicles to reduce the weight of the vehicle in order to improve all electric range (AER). Accordingly, lightweight materials, such as aluminum and CFRP, are applied to a plurality of members, a plurality of panels, etc. constituting the vehicle body. Members having complicated shapes according to their related components and layout may use aluminum materials, extruded materials, high-vacuum die casting materials, etc., which have a density of about ⅓ compared to steel, thereby forming a main frame structure of the vehicle body.

As a rear side member has a complicated shape according to its related components and layout, the rear side member may be difficult to manufacture by extrusion molding, but may be manufactured by high-vacuum die casting. As the rear side member is manufactured by high-vacuum die casting, the rear side member has an open transverse cross-section. As a plurality of reinforcing members and auxiliary members for forming a closed transverse cross-section are attached to the rear side member by welding and/or the like, a relatively large number of components are added, resulting in the increased weight.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a vehicle side member which is designed to be one-piece construction with its related components by low pressure casting (hollow casting) and/or the like, thereby reducing the number of components to be assembled and the weight of a vehicle body.

According to an aspect of the present disclosure, a vehicle side member may include: a main member portion which extends in a longitudinal direction of a vehicle; a front-side mounting portion which is one-piece construction with a front portion of the main member portion; a rear-side mounting portion which is one-piece construction with a rear portion of the main member portion; and a damper mounting portion which is one-piece construction with the main member portion, and in which a top end of a damper is received and mounted.

The main member portion may include: a main top wall; a main bottom wall opposing the main top wall; a main inboard sidewall facing the interior of the vehicle; a main outboard sidewall facing the exterior of the vehicle; and a main cavity defined by the main top wall, the main bottom wall, the main inboard sidewall, and the main outboard sidewall.

The front-side mounting portion may extend from the front portion of the main member portion toward the front of the vehicle, and the front-side mounting portion may be joined to a side sill.

The rear-side mounting portion may extend from the rear portion of the main member portion toward a rear of the vehicle, and the rear-side mounting portion may be joined to a rear longitudinal member.

The damper mounting portion may have a mounting cavity which is recessed from the main bottom wall toward the main top wall.

The damper mounting portion may include a front-side mounting wall facing the front of the vehicle, a rear-side mounting wall facing the rear of the vehicle, an inboard-side mounting wall facing the interior of the vehicle, an outboard-side mounting wall facing the exterior of the vehicle, and a support surface located under the main top wall of the main member portion, and the mounting cavity may be defined by the front-side mounting wall, the rear-side mounting wall, the inboard-side mounting wall, the outboard-side mounting wall, and the support surface.

The front-side mounting wall may be supported by a front-side reinforcing rib, and the front-side reinforcing rib may be integrally connected to the front-side mounting wall. The rear-side mounting wall may be supported by a rear-side reinforcing rib, and the rear-side reinforcing rib may be integrally connected to the rear-side mounting wall. The inboard-side mounting wall may be supported by an inboard-side reinforcing rib, and the inboard-side reinforcing rib may be integrally connected to the inboard-side mounting wall. The outboard-side mounting wall may be supported by an outboard-side reinforcing rib, and the outboard-side reinforcing rib may be integrally connected to the outboard-side mounting wall.

The vehicle side member may further include an annular closed wall construction surrounding the damper mounting portion.

The vehicle side member may further include a reinforcing cavity defined between the annular closed wall construction and the damper mounting portion.

The vehicle side member may further include a plurality of side mounting portions protruding from a main inboard sidewall of the main member portion toward the interior of the vehicle, and each side mounting portion may be joined to each end portion of a crossmember mounted on a floor panel.

The vehicle side member may further include: a front mounting hardware component to which a front mounting portion of a subframe is mounted, and which is integrally mounted on a main bottom wall of the main member portion;

and a rear mounting hardware component to which a rear mounting portion of the subframe is mounted, and which is integrally mounted on the main bottom wall of the main member portion.

The main bottom wall may have a first mounting surface to which the front mounting hardware component is mounted, and a second mounting surface to which the rear mounting hardware component is mounted, and the first mounting surface and the second mounting surface may be flat.

The front-side mounting portion, the rear-side mounting portion, the damper mounting portion, and the main member portion may be made of an aluminum material.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
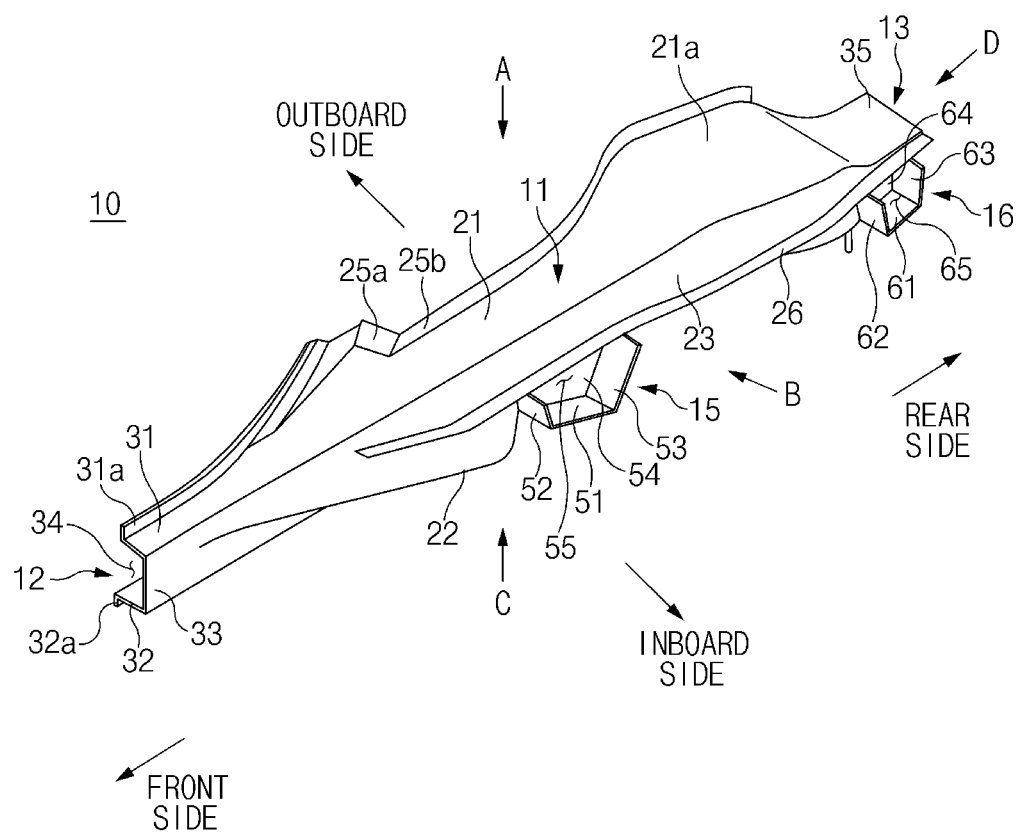
FIG. 1 illustrates a top perspective view of a vehicle side member according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary forms of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
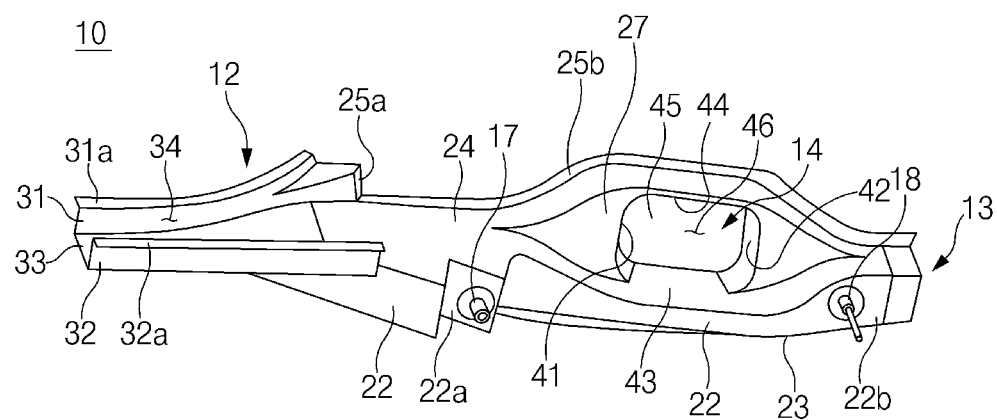
FIG. 2 illustrates a bottom perspective view of a vehicle side member according to an exemplary form of the present disclosure.
Figure 3:
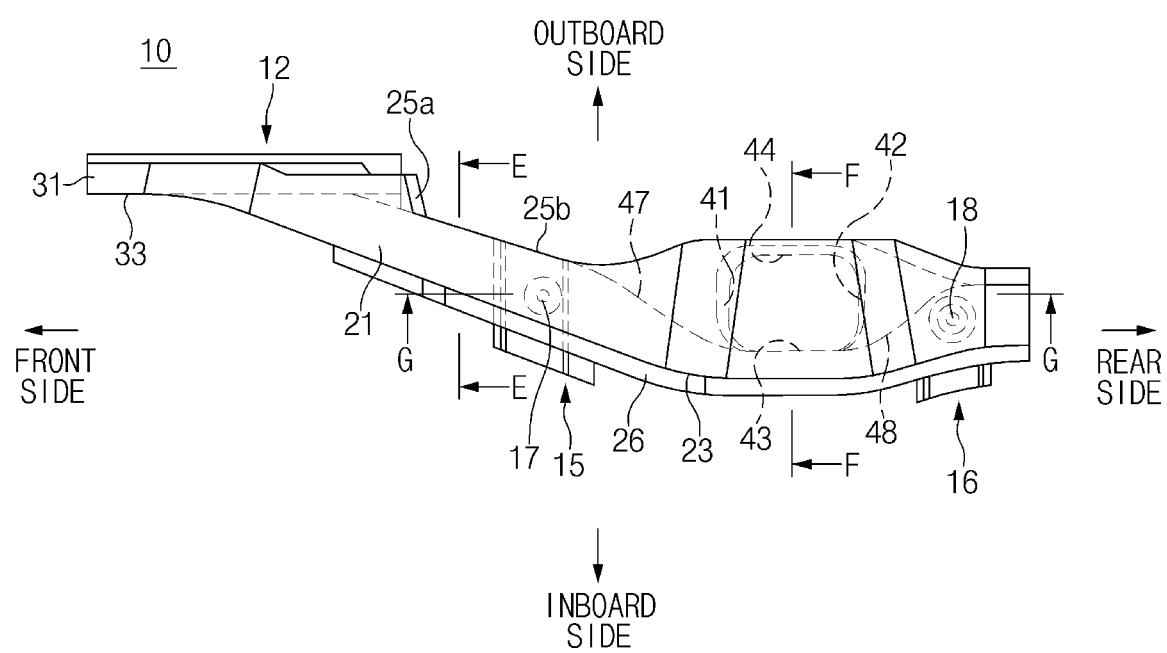
FIG. 3 illustrates a plan view which is viewed from a direction indicated by arrow A of FIG. 1.

Referring to FIGS. 1 and 2, a vehicle side member 10 according to an exemplary form of the present disclosure may include: a main member portion 11 which extends in a longitudinal direction of a vehicle, a front-side mounting portion 12 which is one-piece construction with the front of the main member portion 11, a rear-side mounting portion 13 which is one-piece construction with the rear of the main member portion 11, and a damper mounting portion 14 which is one-piece construction with the main member portion 11.

The vehicle side member 10 according to an exemplary form of the present disclosure may be made of aluminum or an aluminum alloy, and the front-side mounting portion 12, the rear-side mounting portion 13, and the damper mounting portion 14 may be integrally connected to the main member portion 11 by low pressure casting (hollow casting). That is, as the vehicle side member 10 is manufactured by low pressure casting and/or the like, the main member portion 11, the front-side mounting portion 12, the rear-side mounting portion 13, the damper mounting portion 14, and a plurality of side mounting portions 15 and 16 may form a unitary one-piece structure. By reducing the number of components of the side member 10 compared to the related art, the weight and manufacturing cost of the vehicle may be reduced.

The main member portion 11 may include a main top wall 21, a main bottom wall 22 opposing the main top wall 21, a main inboard sidewall 23 facing the interior of the vehicle, and a main outboard sidewall 24 facing the exterior of the vehicle.

Figure 11:
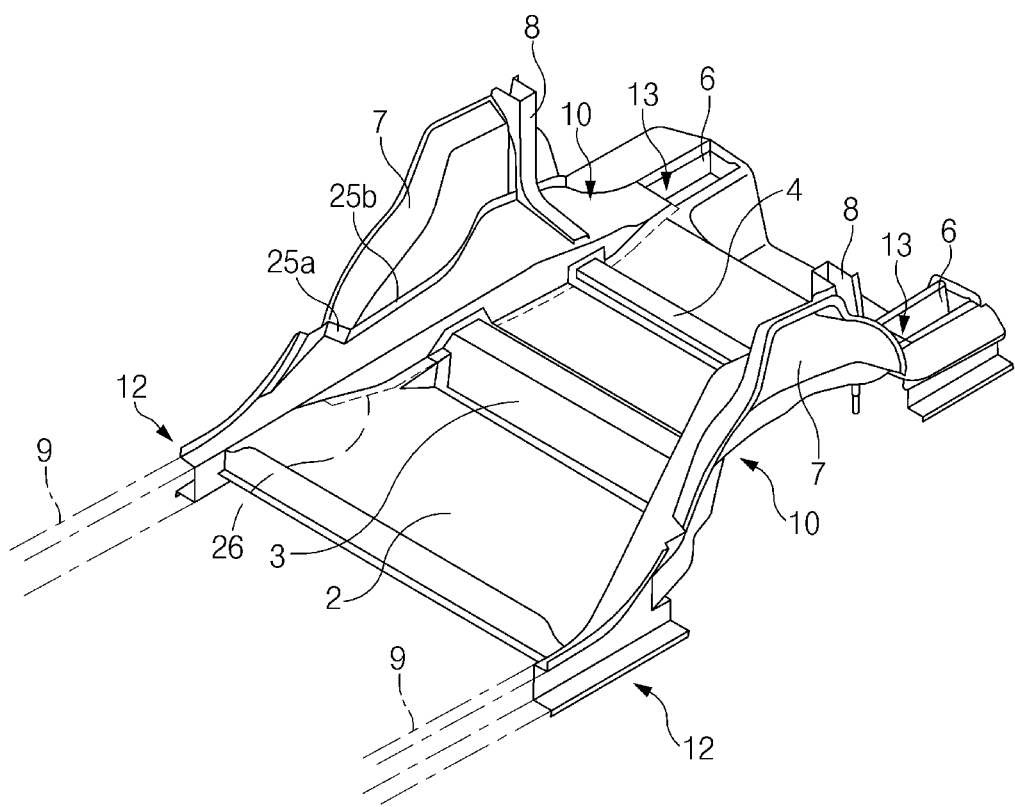
FIG. 11 illustrates a top perspective view of a vehicle side member according to an exemplary form of the present disclosure, which is mounted on a rear floor panel of a vehicle.

Referring to FIGS. 1 and 2, the main top wall 21 may face the top of the vehicle, and the main top wall 21 may extend in the longitudinal direction of the vehicle. The main top wall 21 may have outboard-side flanges 25a and 25b extending along outboard-side edges thereof. Referring to FIG. 11, the outboard-side flanges 25a and 25b may be joined to a wheelhouse 7 by welding, using fasteners, and/or the like. The outboard-side flanges 25a and 25b may include a first outboard-side flange 25a joined to a front surface of the wheelhouse 7 and a second outboard-side flange 25b joined to a sidewall of the wheelhouse 7. The first outboard-side flange 25a may extend in a width direction of the main member portion 11, and the second outboard-side flange 25b may extend in a longitudinal direction of the main member portion 11, and thus the first outboard-side flange 25a may be perpendicular to the second outboard-side flange 25b. The main member portion 11 may be joined to the wheelhouse 7 through the first and second outboard-side flanges 25a and 25b, and a mounting bracket 8 may be joined to the wheelhouse 7 and the main member portion 11.

Referring to FIG. 2, the main bottom wall 22 may face the bottom of the vehicle (or the ground), and the main bottom wall 22 may extend in the longitudinal direction of the vehicle. A front mounting hardware component 17 and a rear mounting hardware component 18 may be integrally mounted on the main bottom wall 22. The front mounting hardware component 17 may be relatively close to the front-side mounting portion 12, and the rear mounting hardware component 18 may be relatively close to the rear-side mounting portion 13. Thus, the front mounting hardware component 17 may be relatively close to the front of the vehicle and the rear mounting hardware component 18 may be relatively close to the rear of the vehicle. A front mounting portion of a subframe (not shown) may be mounted to the front mounting hardware component 17 through a front elastic bush, and a rear mounting portion of the subframe may be mounted to the rear mounting hardware component 18 through a rear elastic bush. For example, the front mounting hardware component 17 may be a pipe nut extending vertically from the main bottom wall 22, and the rear mounting hardware component 18 may be a mounting stud or mounting rod extending vertically from the main bottom wall 22.

Figure 9:
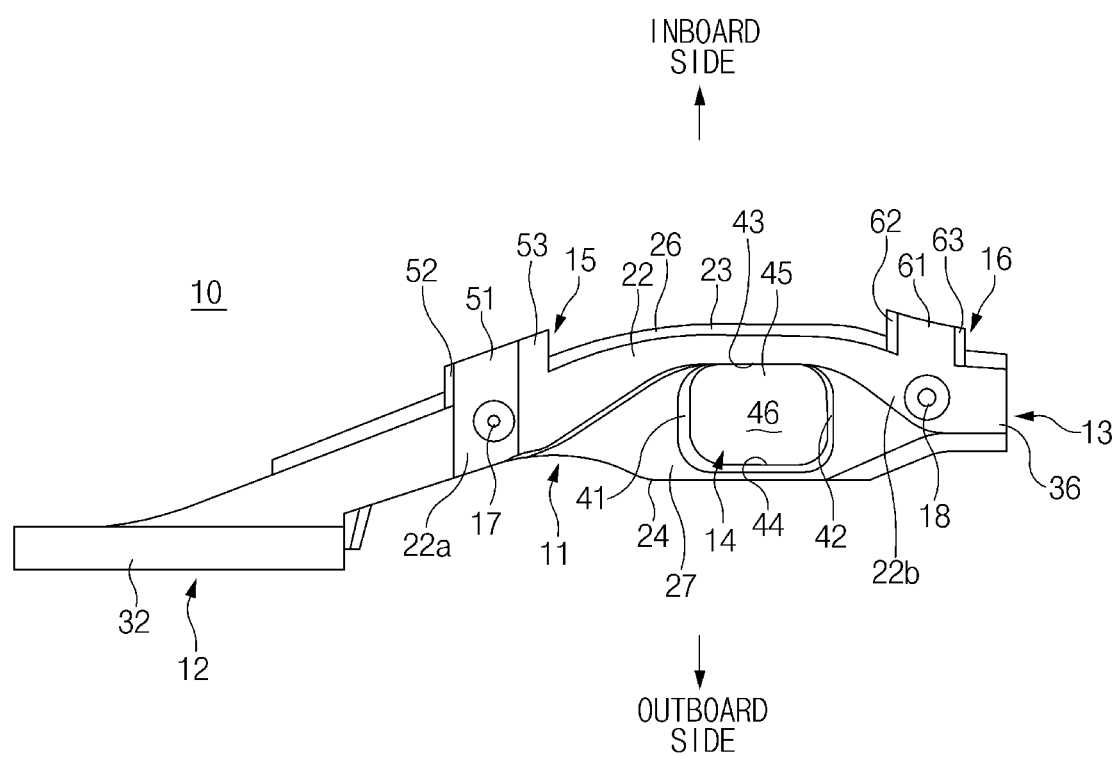
FIG. 9 illustrates a bottom view which is viewed from a direction indicated by arrow C of FIG. 1.
Figure 10:
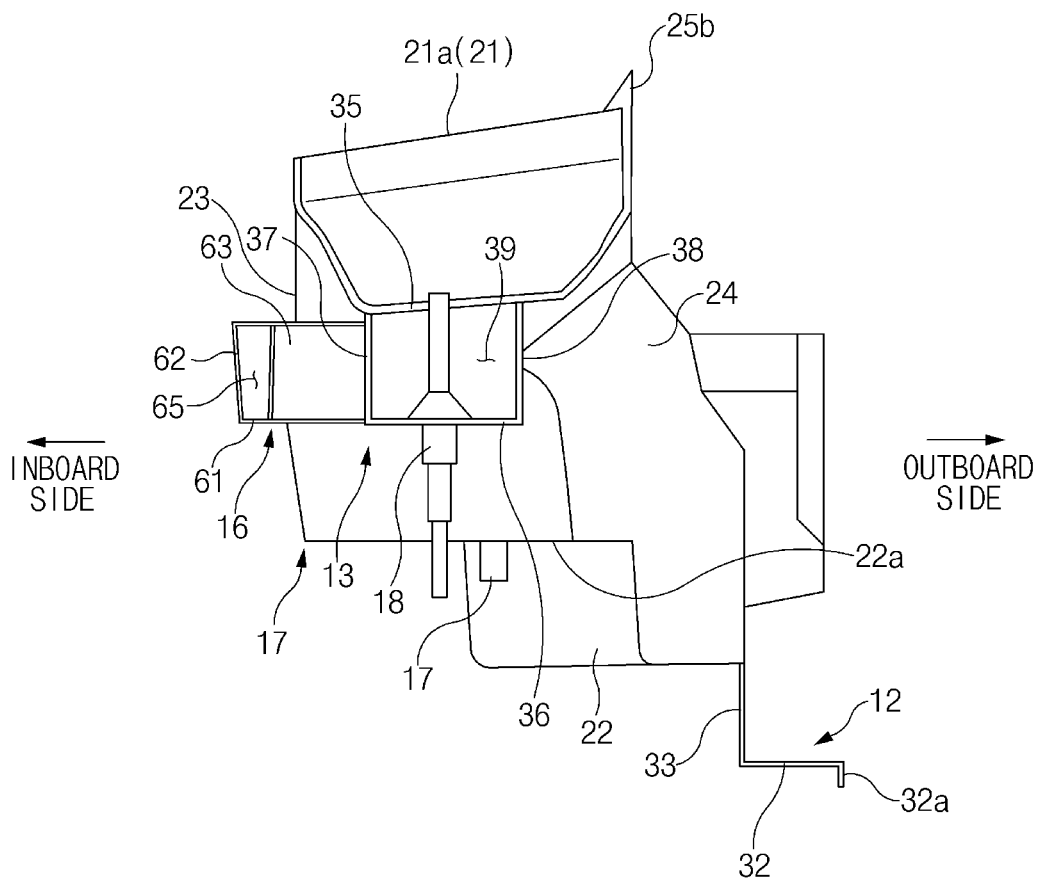
FIG. 10 illustrates a rear view which is viewed from a direction indicated by arrow D of FIG. 1.

Referring to FIG. 9, the main bottom wall 22 may have a first mounting surface 22a on which the front mounting hardware component 17 is provided, and a second mounting surface 22b on which the rear mounting hardware component 18 is provided. The first mounting surface 22a may be located in front of the second mounting surface 22b. The first mounting surface 22a and the second mounting surface 22b may be flat by considering contacts with the front elastic bush and the rear elastic bush. According to an exemplary form of the present disclosure, as the mounting hardware components 17 and 18 for the mounting of the subframe are one-piece construction with the main bottom wall 22 of the main member portion 11, separate brackets may not be needed for the assembly of the mounting hardware components 17 and 18, and thus the manufacturing cost and weight may be reduced.

Figure 4:
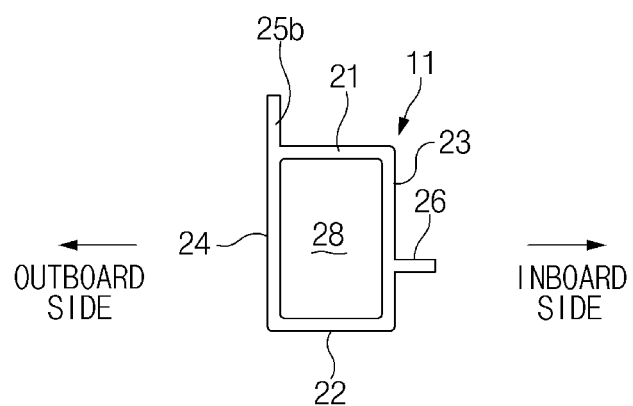
FIG. 4 illustrates a cross-sectional view taken along line E-E of FIG. 3.
Figure 12:
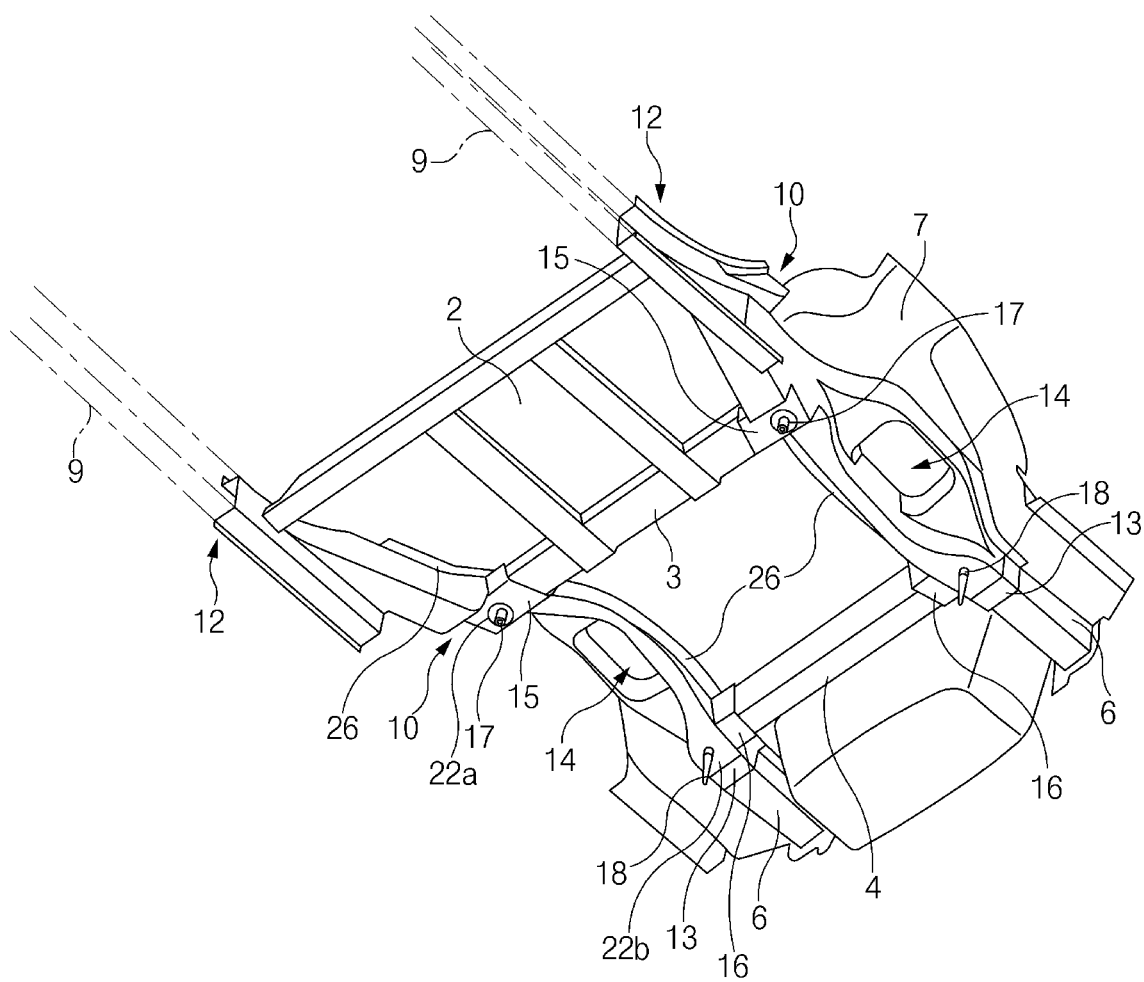
FIG. 12 illustrates a bottom perspective view of a vehicle side member according to an exemplary form of the present disclosure, which is mounted on a rear floor panel of a vehicle.

Referring to FIGS. 1 and 4, the main inboard sidewall 23 may face the interior of the vehicle, and the main inboard sidewall 23 may extend in the longitudinal direction of the vehicle. The main inboard sidewall 23 may have an inboard-side flange 26 extending in the longitudinal direction of the main member portion 11. The inboard-side flange 26 may extend along an edge of a floor panel 2. As illustrated in FIGS. 11 and 12, the inboard-side flange 26 may be joined to the edge of the floor panel 2 by welding, using fasteners, and/or the like.

Referring to FIG. 2, the main outboard sidewall 24 may face the exterior of the vehicle, and the main outboard sidewall 24 may extend in the longitudinal direction of the vehicle.

Referring to FIG. 4, the main member portion 11 may include a main cavity 28 defined by the main top wall 21, the main bottom wall 22, the main inboard sidewall 23, and the main outboard sidewall 24, and thus the main member portion 11 may have a closed transverse cross-section defined by the main top wall 21, the main bottom wall 22, the main inboard sidewall 23, and the main outboard sidewall 24. In particular, as the main top wall 21, the main bottom wall 22, the main inboard sidewall 23, and the main outboard sidewall 24 are continuously formed in the longitudinal direction of the vehicle, the closed transverse cross-section of the main member portion 11 may be continuous along the longitudinal direction of the main member portion 11. According to an exemplary form of the present disclosure, as the closed transverse cross-section of the main member portion 11 is continuous along the longitudinal direction of the main member portion 11, stiffness and strength of the main member portion 11 may be significantly improved without additional reinforcing members.

Referring to FIGS. 1 and 2, the front-side mounting portion 12 may extend from the front portion of the main member portion 11 toward the front of the vehicle. In particular, the front-side mounting portion 12 may extend in the longitudinal direction of the vehicle.

Referring to FIGS. 11 and 12, the front-side mounting portion 12 may be joined to a side sill 9 by welding and/or the like. The front-side mounting portion 12 may include a front top wall 31 facing the top of the vehicle, a front bottom wall 32 opposing to the front top wall 31, a front inboard sidewall 33 facing the interior of the vehicle, a top flange 31a extending along an edge of the front top wall 31, and a bottom flange 32a extending along an edge of the front bottom wall 32. The front-side mounting portion 12 may be open to the exterior of the vehicle. The front-side mounting portion 12 may have an open cavity 34 defined by the front top wall 31, the front bottom wall 32, and the front inboard sidewall 33, and the open cavity 34 of the front-side mounting portion 12 may receive an end portion of the side sill 9. The front top wall 31 of the front-side mounting portion 12 may be continuous from the main top wall 21 of the main member portion 11 along the longitudinal direction of the vehicle, and the front bottom wall 32 of the front-side mounting portion 12 may be continuous from the main bottom wall 22 of the main member portion 11 along the longitudinal direction of the vehicle. The front inboard sidewall 33 of the front-side mounting portion 12 may be continuous from the main inboard sidewall 23 of the main member portion 11 along the longitudinal direction of the vehicle.

Referring to FIGS. 1 and 2, the rear-side mounting portion 13 may extend from the rear portion of the main member portion 11 toward the rear of the vehicle. In particular, the rear-side mounting portion 13 may extend in the longitudinal direction of the vehicle. Referring to FIGS. 11 and 12, the rear-side mounting portion 13 may be joined to a rear longitudinal member 6 by welding and/or the like. The rear-side mounting portion 13 may include a rear top wall 35 facing the top of the vehicle, a rear bottom wall 36 opposing to the rear top wall 35, a rear inboard sidewall 37 facing the interior of the vehicle, and a rear outboard sidewall 38 facing the exterior of the vehicle. The rear-side mounting portion 13 may have a cavity 39 defined by the rear top wall 35, the rear bottom wall 36, the rear inboard sidewall 37, and the rear outboard sidewall 38, and the cavity 39 of the rear-side mounting portion 13 may receive an end portion of the rear longitudinal member 6. The rear top wall 35 of the rear-side mounting portion 13 may be continuous from the main top wall 21 of the main member portion 11 along the longitudinal direction of the vehicle, and the rear bottom wall 36 of the rear-side mounting portion 13 may be continuous from the main bottom wall 22 of the main member portion 11 along the longitudinal direction of the vehicle. The rear inboard sidewall 37 of the rear-side mounting portion 13 may be continuous from the main inboard sidewall 23 of the main member portion 11 along the longitudinal direction of the vehicle, and the rear outboard sidewall 38 of the rear-side mounting portion 13 may be continuous from the main outboard sidewall 24 of the main member portion 11 along the longitudinal direction of the vehicle.

The damper mounting portion 14 may be one-piece construction with the main member portion 11 to receive a top end of a damper 5 such as a shock absorber. That is, the damper mounting portion 14 may be a damper housing integrally formed with the main member portion 11. Referring to FIG. 2, the damper mounting portion 14 may be provided on a portion of the main member portion 11 adjacent to the main outboard sidewall 24 and the rear-side mounting portion 13. The damper mounting portion 14 may be recessed from the main bottom wall 22 toward the main top wall 21.

Referring to FIGS. 2, 5, 6, and 9, the main member portion 11 may further include a recessed bottom wall 27 which is recessed from the main bottom wall 22 toward the main top wall 21. The recessed bottom wall 27 may be adjacent to the main outboard sidewall 24 and the rear-side mounting portion 13, and the damper mounting portion 14 may be located in the recessed bottom wall 27. The damper mounting portion 14 may be recessed from the recessed bottom wall 27 of the main member portion 11 toward the main top wall 21 of the main member portion 11. The damper mounting portion 14 may have a mounting cavity 46 in which the top end of the damper 5 is received and mounted.

Referring to FIG. 2, the damper mounting portion 14 may include a front-side mounting wall 41 facing the front of the vehicle, a rear-side mounting wall 42 facing the rear of the vehicle, an inboard-side mounting wall 43 facing the interior of the vehicle, an outboard-side mounting wall 44 facing the exterior of the vehicle, and a support surface 45 located under the main top wall 21 of the main member portion 11. The damper mounting portion 14 may include the mounting cavity 46 defined by the front-side mounting wall 41, the rear-side mounting wall 42, the inboard-side mounting wall 43, the outboard-side mounting wall 44, and the support surface 45. In particular, the mounting cavity 46 may be recessed from the recessed bottom wall 27 of the main member portion 11 toward the main top wall 21 of the main member portion 11. As the top end of the damper 5 such as the shock absorber is received in the mounting cavity 46, the top end of the damper 5 may be supported to the damper mounting portion 14, and the support surface 45 may be flat to support a top end surface of the damper 5.

Figure 6:
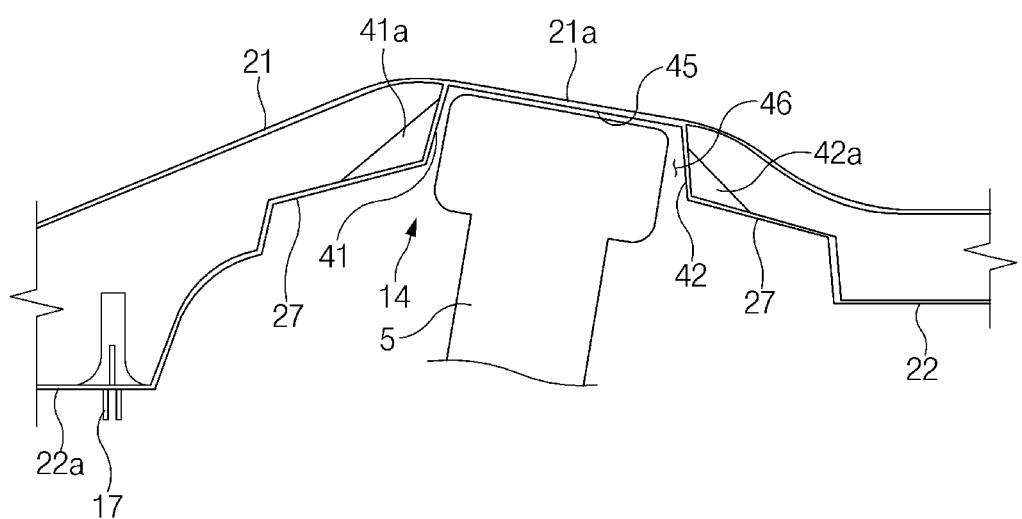
FIG. 6 illustrates a cross-sectional view taken along line G-G of FIG. 3.

Referring to FIGS. 1 and 6, the main top wall 21 may have an apex portion 21a protruding upwardly, and the apex portion 21a may be provided in a position corresponding to that of the damper mounting portion 14. The apex portion 21a may be flat, and the support surface 45 of the damper mounting portion 14 may be located under the apex portion 21a.

Referring to FIG. 6, the front-side mounting wall 41 may be supported by a front-side reinforcing rib, and the front-side reinforcing rib 41a may be integrally connected between the front-side mounting wall 41 and the recessed bottom wall 27. The front-side reinforcing rib 41a may extend in a direction perpendicular to the front-side mounting wall 41. The rear-side mounting wall 42 may be supported by a rear-side reinforcing rib 42a, and the rear-side reinforcing rib 42a may be integrally connected between the rear-side mounting wall 42 and the recessed bottom wall 27. The rear-side reinforcing rib 42a may extend in a direction perpendicular to the rear-side mounting wall 42. Thus, stiffness of the damper mounting portion 14 in the longitudinal direction may be increased by the front-side mounting wall 41, the rear-side mounting wall 42, the front-side reinforcing rib 41a, and the rear-side reinforcing rib 42a.

Figure 5:
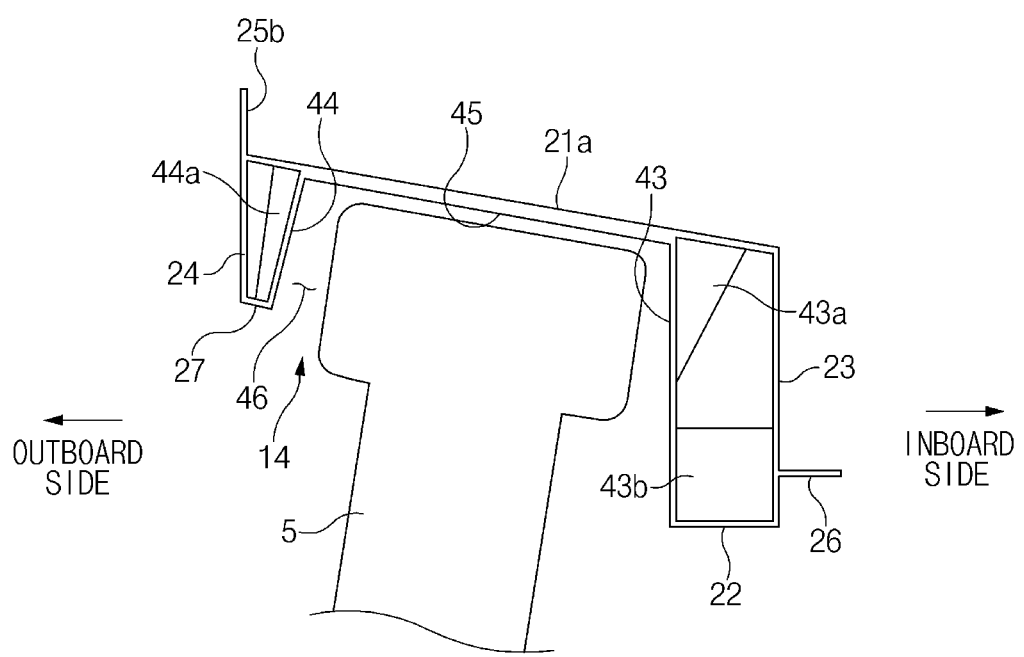
FIG. 5 illustrates a cross-sectional view taken along line F-F of FIG. 3.

Referring to FIG. 5, the inboard-side mounting wall 43 may be spaced apart from the main inboard sidewall 23, and an inboard-side closed transverse cross-section may be defined by the inboard-side mounting wall 43, the apex portion 21a of the main top wall 21, the main inboard sidewall 23, and the main bottom wall 22. The inboard-side closed transverse cross-section may face the interior of the vehicle. The inboard-side mounting wall 43 may be supported by a plurality of inboard-side reinforcing ribs 43a and 43b, and the plurality of inboard-side reinforcing ribs 43a and 43b may be integrally connected to the inboard-side mounting wall 43. Each of the inboard-side reinforcing ribs 43a and 43b may extend in a direction perpendicular to the inboard-side mounting wall 43. For example, the inboard-side mounting wall 43 may have a length greater than that of the front-side mounting wall 41, the rear-side mounting wall 42, and the outboard-side mounting wall 44, and the inboard-side mounting wall 43 may be supported by the plurality of inboard-side reinforcing ribs 43a and 43b. For example, a first inboard-side reinforcing rib 43a may be integrally connected to an upper portion of the inboard-side mounting wall 43 and the apex portion 21a of the main top wall 21 to support the upper portion of the inboard-side mounting wall 43, and a second inboard-side reinforcing rib 43b may be integrally connected to a lower portion of the inboard-side mounting wall 43, the main bottom wall 22, and the main inboard sidewall 23 to support the lower portion of the inboard-side mounting wall 43.

Referring to FIG. 5, the outboard-side mounting wall 44 may be spaced apart from the main outboard sidewall 24, and an outboard-side closed transverse cross-section may be defined by the outboard-side mounting wall 44, the main outboard sidewall 24, the apex portion 21a of the main top wall 21, and the recessed bottom wall 27. The outboard-side closed transverse cross-section may face the exterior of the vehicle. The outboard-side mounting wall 44 may be supported by an outboard-side reinforcing rib 44a, and the outboard-side reinforcing rib 44a may be integrally connected to the outboard-side mounting wall 44. The outboard-side reinforcing rib 44a may extend in a direction perpendicular to the outboard-side mounting wall 44. Thus, stiffness of the damper mounting portion 14 in the width direction may be increased by the inboard-side mounting wall 43, the outboard-side mounting wall 44, the plurality of inboard-side reinforcing ribs 43a and 43b, and the outboard-side reinforcing rib 44a.

Referring to FIG. 5, as the length of the inboard-side mounting wall 43 is greater than that of the outboard-side mounting wall 44, and the length of the main inboard sidewall 23 is greater than that of the main outboard sidewall 24, the size of the inboard-side closed transverse cross-section may be greater than that of the outboard-side closed transverse cross-section, and thus the top end of the damper 5 may be firmly supported by the outboard-side closed transverse cross-section.

Figure 8:
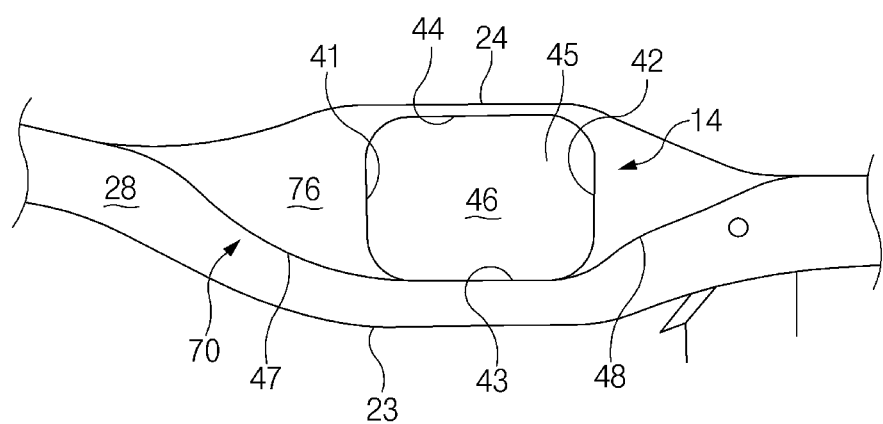
FIG. 8 illustrates a cross-sectional view taken along line H-H of FIG. 7.

Referring to FIG. 8, the vehicle side member 10 according to an exemplary form of the present disclosure may further include a first reinforcing wall 47 extending from a front end of the inboard-side mounting wall 43 of the damper mounting portion 14 toward the front of the vehicle within the main cavity 28 of the main member portion 11, and a second reinforcing wall 48 extending from a rear end of the inboard-side mounting wall 43 of the damper mounting portion 14 toward the rear of the vehicle within the main cavity 28 of the main member portion 11.

A rear end of the first reinforcing wall 47 may be connected to the front end of the inboard-side mounting wall 43, and a front end of the first reinforcing wall 47 may be connected to the main outboard sidewall 24 of the main member portion 11. A front end of the second reinforcing wall 48 may be connected to the rear end of the inboard-side mounting wall 43, and a rear end of the second reinforcing wall 48 may be connected to the main outboard sidewall 24 of the main member portion 11. Thus, the first reinforcing wall 47, the inboard-side mounting wall 43, the second reinforcing wall 48, and a portion of the main outboard sidewall 24 of the main member portion 11 may form a closed wall construction 70 continuously surrounding the front-side mounting wall 41, the rear-side mounting wall 42, the inboard-side mounting wall 43, and the outboard-side mounting wall 44 of the damper mounting portion 14. That is, the closed wall construction 70 may include the first reinforcing wall 47, the second reinforcing wall 48, and the portion of the main outboard sidewall 24. In particular, as the closed wall construction 70 is spaced apart from at least some of the mounting walls of the damper mounting portion 14, a reinforcing cavity 76 may be defined between the closed wall construction 70 and the damper mounting portion 14. In particular, the reinforcing cavity 76 may be separated from the main cavity 28 of the main member portion 11 by the first reinforcing wall 47 and the second reinforcing wall 48. As the closed wall construction is provided around the damper mounting portion 14, stiffness of the damper mounting portion 14 and mounting stiffness of the damper 5 may be increased. In particular, as the closed wall construction 70 has an annular shape such as an oval or an ellipse, a load applied to the damper 5 may be uniformly distributed to the closed wall construction 70 and the side member 10, and the stiffness of the damper mounting portion 14 may be further increased.

The vehicle side member 10 according to an exemplary form of the present disclosure may further include the plurality of side mounting portions 15 and 16 protruding from the main inboard sidewall 23 of the main member portion 11 toward the interior of the vehicle. Referring to FIGS. 11 and 12, the side mounting portions 15 and 16 may be joined to end portions of crossmembers 3 and 4 mounted on the floor panel 2, respectively.

In another form, a first crossmember 3 and a second crossmember 4 may be mounted on the floor panel 2, and the first crossmember 3 and the second crossmember 4 may extend in a width direction of the floor panel 2. The first crossmember 3 and the second crossmember 4 may be spaced apart from each other in the longitudinal direction of the vehicle, and the first crossmember 3 may be located in front of the second crossmember 4. The plurality of side mounting portions 15 and 16 may include a first side mounting portion 15 to which the end portion of the first crossmember 3 is joined, and a second side mounting portion 16 to which the end portion of the second crossmember 4 is joined.

Figure 7:
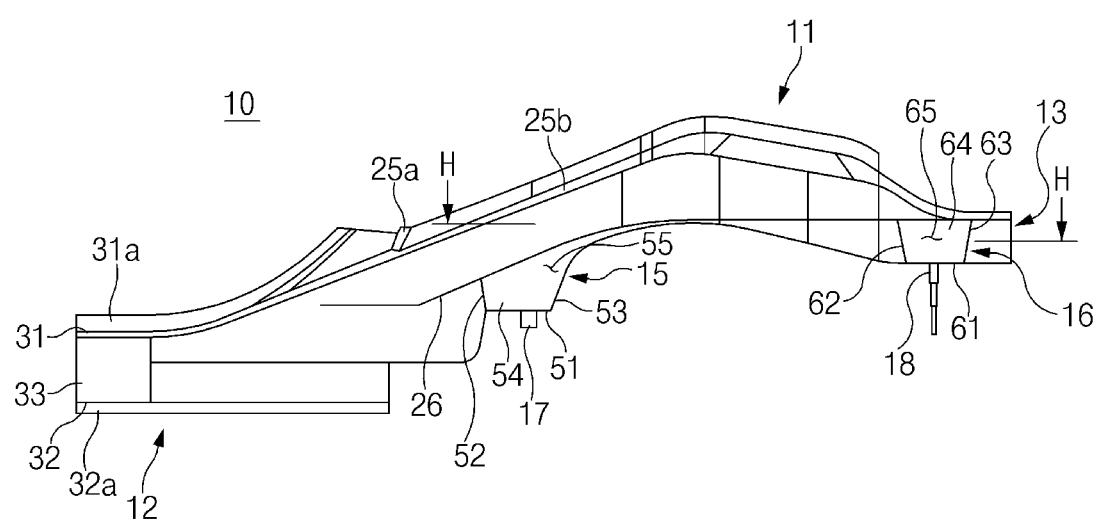
FIG. 7 illustrates a side view which is viewed from a direction indicated by arrow B of FIG. 1.

Referring to FIGS. 1, 7, and 9, the first side mounting portion 15 may include a first bottom wall 51 extending horizontally from the main bottom wall 22 of the main member portion 11, a first front wall 52 facing the front of the vehicle, a first rear wall 53 facing the rear of the vehicle, and a first closed wall 54 adjacent to the main inboard sidewall 23 of the main member portion 11. The first bottom wall 51 may extend horizontally from the main bottom wall 22 of the main member portion 11. Referring to FIG. 9, the first bottom wall 51 may be aligned with the first mounting surface 22a of the main bottom wall 22. The first front wall 52 may extend upwardly from a front end of the first bottom wall 51, and the first rear wall 53 may extend upwardly from a rear end of the first bottom wall 51. The first closed wall 54 may have a flat surface perpendicular to the first bottom wall 51, the first front wall 52, and the first rear wall 53. The first side mounting portion 15 may include a first side cavity 55 defined by the first bottom wall 51, the first front wall 52, the first rear wall 53, and the first closed wall 54. Referring to FIGS. 11 and 12, the end portion of the first crossmember 3 may be received in and joined to the first side cavity 55 of the first side mounting portion 15 by welding and/or the like.

Referring to FIGS. 1, 7, and 9, the second side mounting portion 16 may include a second bottom wall 61 extending horizontally from the main bottom wall 22 of the main member portion 11, a second front wall 62 facing the front of the vehicle, a second rear wall 63 facing the rear of the vehicle, and a second closed wall 64 adjacent to the main inboard sidewall 23 of the main member portion 11. The second bottom wall 61 may extend horizontally from the main bottom wall 22 of the main member portion 11. Referring to FIG. 9, the second bottom wall 61 may be aligned with the second mounting surface 22b of the main bottom wall 22. The second front wall 62 may extend upwardly from a front end of the second bottom wall 61, and the second rear wall 63 may extend upwardly from a rear end of the second bottom wall 61. The second closed wall 64 may have a flat surface perpendicular to the second bottom wall 61, the second front wall 62, and the second rear wall 63. The second side mounting portion 16 may include a second side cavity 65 defined by the second bottom wall 61, the second front wall 62, the second rear wall 63, and the second closed wall 64. Referring to FIGS. 11 and 12, the end portion of the second crossmember 4 may be received in and joined to the second side cavity 65 of the second side mounting portion 16 by welding and/or the like.

According to an exemplary form, as illustrated in FIGS. 11 and 12, the vehicle side member 10 may be a rear side member disposed on the rear of the vehicle.

In one form, the floor panel 2 may be a rear floor panel disposed on the rear of the vehicle, and the rear longitudinal member 6 may be a reinforcing member disposed on the rearmost portion of the vehicle. The first crossmember 3 and the second crossmember 4 may be mounted on the floor panel 2, and the front-side mounting portion 12 of the side member 10 may be joined to a rear end of the side sill 9.

The outboard-side flanges 25a and 25b of the side member 10 may be joined to the wheelhouse 7 of the vehicle body by welding, using fasteners, and/or the like. The outboard-side flanges 25a and 25b may include the first outboard-side flange 25a joined to the front surface of the wheelhouse 7 and the second outboard-side flange 25b joined to the sidewall of the wheelhouse 7.

As set forth above, according to exemplary forms of the present disclosure, the front-side mounting portion 12, the rear-side mounting portion 13, and the damper mounting portion 14 may be one-piece construction with the main member portion 11 by low pressure casting (hollow casting) and/or the like, which may reduce the number of components and the weight and manufacturing cost of the vehicle body.

According to exemplary forms of the present disclosure, as the annular closed wall construction is provided to surround the damper mounting portion 14, the stiffness of the damper mounting portion 14 and the mounting stiffness and/or support stiffness of the damper 5 may be increased, and the load applied to the damper 5 may be uniformly distributed through the closed wall construction and the side member.

According to exemplary forms of the present disclosure, the main member portion 11, the front-side mounting portion 12, the rear-side mounting portion 13, the damper mounting portion 14, and the plurality of side mounting portions 15 and 16 may form a unitary one-piece structure. Thus, welded joints may be significantly reduced, and stiffness at mounting points and crashworthiness may be improved.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A vehicle side member, comprising:
   a main member portion configured to extend in a longitudinal direction of a vehicle;
   a front-side mounting portion which is one-piece construction with a front portion of the main member portion;
   a rear-side mounting portion which is one-piece construction with a rear portion of the main member portion; and
   a damper mounting portion which is one-piece construction with the main member portion, and in which a top end of a damper is received and mounted,
   wherein the main member portion includes:
   a main top wall;
   a main bottom wall opposing to the main top wall;
   a main inboard sidewall facing an interior of the vehicle;
   a main outboard sidewall opposing to the main inboard sidewall and configured to face an exterior of the vehicle and; and
   a main cavity defined by the main top wall, the main bottom wall, the main inboard sidewall, and the main outboard sidewall.

2. The vehicle side member according to claim 1, wherein the damper mounting portion has a mounting cavity which is recessed from the main bottom wall toward the main top wall.

3. The vehicle side member according to claim 2, wherein:
   the damper mounting portion includes:
   a front-side mounting wall facing a front of the vehicle,
   a rear-side mounting wall facing a rear of the vehicle,
   an inboard-side mounting wall facing the interior of the vehicle,
   an outboard-side mounting wall facing the exterior of the vehicle, and
   a support surface located under the main top wall of the main member portion, and
   the mounting cavity is defined by the front-side mounting wall, the rear-side mounting wall, the inboard-side mounting wall, the outboard-side mounting wall, and the support surface.

4. The vehicle side member according to claim 2, wherein:
   the front-side mounting wall is supported by a front-side reinforcing rib,
   the front-side reinforcing rib is integrally connected to the front-side mounting wall,
   the rear-side mounting wall is supported by a rear-side reinforcing rib,
   the rear-side reinforcing rib is integrally connected to the rear-side mounting wall,
   the inboard-side mounting wall is supported by an inboard-side reinforcing rib,
   the inboard-side reinforcing rib is integrally connected to the inboard-side mounting wall,
   the outboard-side mounting wall is supported by an outboard-side reinforcing rib, and
   the outboard-side reinforcing rib is integrally connected to the outboard-side mounting wall.

5. The vehicle side member according to claim 2, further comprising: an annular closed wall construction surrounding the damper mounting portion.

6. The vehicle side member according to claim 5, further comprising: a reinforcing cavity defined between the annular closed wall construction and the damper mounting portion.

7. The vehicle side member according to claim 1, wherein:
   the front-side mounting portion is configured to extend from the front portion of the main member portion toward a front of the vehicle, and
   the front-side mounting portion is joined to a side sill.

8. The vehicle side member according to claim 1, wherein:
   the rear-side mounting portion is configured to extend from the rear portion of the main member portion toward a rear of the vehicle, and
   the rear-side mounting portion is joined to a rear longitudinal member.

9. The vehicle side member according to claim 1, further comprising: a plurality of side mounting portions configured to protrude from a main inboard sidewall of the main member portion toward an interior of the vehicle,
   wherein each side mounting portion of the plurality of side mounting portions is joined to each end portion of a crossmember mounted on a floor panel.

10. The vehicle side member according to claim 1, further comprising:
    a front mounting hardware component to which a front mounting portion of a subframe is mounted, and which is integrally mounted on a main bottom wall of the main member portion; and
    a rear mounting hardware component to which a rear mounting portion of the subframe is mounted, and which is integrally mounted on the main bottom wall of the main member portion.

11. The vehicle side member according to claim 10, wherein:
    the main bottom wall has a first mounting surface to which the front mounting hardware component is mounted, and a second mounting surface to which the rear mounting hardware component is mounted, and
    the first mounting surface and the second mounting surface are flat.

12. The vehicle side member according to claim 1, wherein the front-side mounting portion, the rear-side mounting portion, the damper mounting portion, and the main member portion are made of an aluminum material.

* * * * *